(12) United States Patent
Trans

(10) Patent No.: US 6,553,085 B1
(45) Date of Patent: Apr. 22, 2003

(54) MEANS AND METHOD FOR INCREASING PERFORMANCE OF INTERFERENCE-SUPPRESSION BASED RECEIVERS

(76) Inventor: Francois Trans, 1504 Clay Dr., Los Altos, CA (US) 94024

( * ) Notice: Subject to any disclaimer, the term of this patent is extended or adjusted under 35 U.S.C. 154(b) by 0 days.

(21) Appl. No.: 09/417,528

(22) Filed: Oct. 13, 1999

Related U.S. Application Data

(63) Continuation-in-part of application No. 09/127,383, filed on Jul. 31, 1998, now Pat. No. 6,377,640.
(60) Provisional application No. 60/109,340, filed on Nov. 20, 1998, provisional application No. 60/085,605, filed on May 15, 1998, provisional application No. 60/054,406, filed on Jul. 31, 1997, provisional application No. 60/054,415, filed on Jul. 31, 1997, provisional application No. 60/089,526, filed on Jun. 15, 1998, provisional application No. 60/104,316, filed on Oct. 13, 1998, and provisional application No. 60/129,314, filed on Apr. 14, 1999.

(51) Int. Cl.[7] .......................... H03D 1/04; H03D 1/06; H03K 5/01; H03K 6/04; H04B 1/10
(52) U.S. Cl. ....................... 375/346; 375/233
(58) Field of Search ................. 375/346, 229, 375/233, 230, 232, 254, 285, 348, 350; 370/286; 708/300, 323, 819

(56) References Cited

U.S. PATENT DOCUMENTS

| | | |
|---|---|---|
| 4,412,341 A | 10/1983 | Gersho et al. |
| 4,630,217 A | 12/1986 | Smith et al. |
| 4,648,060 A | 3/1987 | Allen et al. |
| 4,905,282 A | 2/1990 | McGlynn et al. |
| 5,162,723 A | 11/1992 | Marzalek et al. |
| 5,541,955 A | 7/1996 | Jacobsmeyer |
| 5,550,810 A | 8/1996 | Monogiousdis et al. ...... 370/18 |
| 5,625,651 A | 4/1997 | Cioffi |
| 5,754,352 A | 5/1998 | Behrens et al. |
| 5,787,363 A | 7/1998 | Scott et al. |
| 5,841,667 A | 11/1998 | Martin |
| 5,930,267 A | 7/1999 | Daneshrad et al. ......... 370/509 |

OTHER PUBLICATIONS

Per Lindgren; *A Multi–Channel Network Architecture Based On Fast Circuit Switching*; May 1996; Kungel Tekniska Högskolan Royal Institute of Technology; pp. i–180.

*Primary Examiner*—Jean Corrielus
(74) *Attorney, Agent, or Firm*—Fenwick & West LLP

(57) ABSTRACT

In a bidirectional data channel between a central station and a multiple of remote stations, a method for equalizing interference over a synchronized packet or frame based baseband transmission system wherein the crosstalk on the system is cyclostationary or periodic with a period equal to a symbol interval, the method comprising the steps of synchronizing the transmitters and receivers using the uncorrelated transmit signals; generating the cyclostationary NEXT and FEXT interference along with ISI using the uncorrelated symbols at the synchronized transmitters at one or more remote stations and the centrally station; using cascaded Fractionally Spaced Linear Equalizer (FSLE) and Decision Feed back Equalizer (DFE) for both interference suppression and equalization to minimize excess bandwidth at central receivers at the central station; increasing the receiver's FSLE filter taps (NT) to maximize Signal to noise ration; combining FSLE/DFE and proper phase sampling adjustments, enabling use of the spectral correlation properties peculiar to the modified signals.

10 Claims, 12 Drawing Sheets

Gigabit Ethernet Over 4 Pairs Of UTP Cables

Worst-case Insertion Loss Of 100m, Cat-5 Cable

Overall Return Loss Of Different Cable Channel

NEXT Loss Between Pairs Of Cat-5 Cables

NEXT Loss Between Pairs Of Cat-5 Cables

FEXT Loss Characteristics

System Modeling

Receiver Structure Using Interference Cancellers Prior To Equalizers

Receiver Using Interference Cancellers After FFE

Receiver Using Cascaded FSLE/DFE For
Both Interference Suppression And Equalization

MEANS AND METHOD FOR INCREASING PERFORMANCE OF INTERFERENCE-SUPPRESSION BASED RECEIVERS

RELATED APPLICATIONS

This application is a continuation-in-part to the commonly owned application Ser. No. 09/127,383, titled "Means and Method for a Synchronous a Network Communications System" filed on Jul. 31, 1998 by Francois Trans, now U.S. Pat. No. 6,377,640 the contents of which are incorporated by reference as if fully disclosed herein and attached as "APPENDIX A." This application also claims priority to the following commonly owned applications: Ser. No. 60/109,340, titled "Means and Method of Precursor ISI Cancellation" filed on Nov. 20, 1998, by Francois Trans; Ser. No. 60/085,605, titled "System And Method For Scalable Com2000 Gigabit Ethernet CAT5 Physical Layer (GPHY4)" filed on May 15, 1998, by Francois Trans; and Ser. No. 60/054,406, titled "Method And Means For A Synchronous Network Communication System" filed on Jul. 31, 1997, by Francois Trans; and Ser. No. 60/054,415 titled "Method And Means For A Universal Information Technological System" filed on Jul. 31, 1997, by Francois Trans; and Ser. No. 60/089,526, titled "Simulation Findings For The Scalable Com2000 Gigabit Ethernet CAT5 Physical Layer (GPHY4)" filed on Jun. 15, 1998, by Francois Trans; and Ser. No. 60/104,316, titled "Means And Method For Increasing Performance Of Interference-Suppression Based FSLE/DFE xDSL Receiver Over Pots Cables" filed on Oct. 13, 1998 by Francois Trans; Ser. No. 60/129,314, titled "Means And Method Of High-Speed Data Transmission Over Existing Mil-STD-1553" filed on Apr. 14, 1999, by Francois Trans.

I. INTRODUCTION

A. Related Art

This invention is related to maximizing the transmission of data over communication networks. More specifically, this invention is related to suppression of cross-talk and interference over communications channels.

B. Background

Interference (echo and crosstalk) is one of the major performance-limiting impairments on UTP cables. In this application, various receiver structures suitable to the transmission of Gigabit Ethernet over 4 pairs of UTP cables are described. Furthermore, the performance of the invention is disclosed through use of a receiver structure that uses a cascade of FSLE and DFE for interference suppression. Some of these results are based on the assumption that the interference can be cyclostationary, i.e., interference statistics are periodic with a period equal to a symbol interval. This is true as long as all transmitter symbol timing clocks are synchronized in frequency. These assumptions are meant to explain the results provided and should not be interpreted as a limitation on the scope of the claims.

Suppression of cyclostationary interference by linear equalizers has been considered previously. Prior studies have identified that linear processing of cyclostationary interfering signals can exploit spectral correlation properties peculiar to these signals. In Section II, we describe the channel characteristics and model the communication channels. In Section III, we present embodiments of the invention including the different receiver structures suitable to the transmission of Gigabit Ethernet over 4 pairs of cat-5 UTP cables. In Section IV, we present the analytical model for the cascaded FSLE/DFE receiver structure using interference suppression approach and its performance analysis. Numerical results on the SNR and numbers of taps required for the FSLE and DFE are discussed in Section V.

SUMMARY OF THE INVENTION

The present invention provides a method for equalizing interference over a synchronized packet or frame based baseband transmission system wherein the crosstalk on the system is cyclostationary or periodic with a period equal to a symbol interval. With reference to FIG. 11, the method comprises the steps of synchronizing 1102 the transmitters and receivers using the uncorrelated transmit signals; generating the cyclostationary NEXT and FEXT interference 1104 along with ISI using the uncorrelated symbols at the synchronized transmitters at one or more remote stations and the central station; using cascaded Fractionally Spaced Linear Equalizer (FSLE) and Decision Feed back Equalizer (DFE) for both interference suppression and equalization 1106 to minimize excess bandwidth at central receivers at the central station; increasing 1108 the receiver's FSLE filter taps (NT) to maximize Signal to noise ratio; increasing 1110 the receiver's DFE filter taps to reduce post-inter-symbol interference; and combining 1112 FSLE/DFE and proper phase sampling adjustments, enabling use of the spectral correlation properties peculiar to the modified signals.

DETAILED DESCRIPTION OF THE INVENTION

II. CHANNEL CHARACTERISTICS AND MODELING

Figure 1:
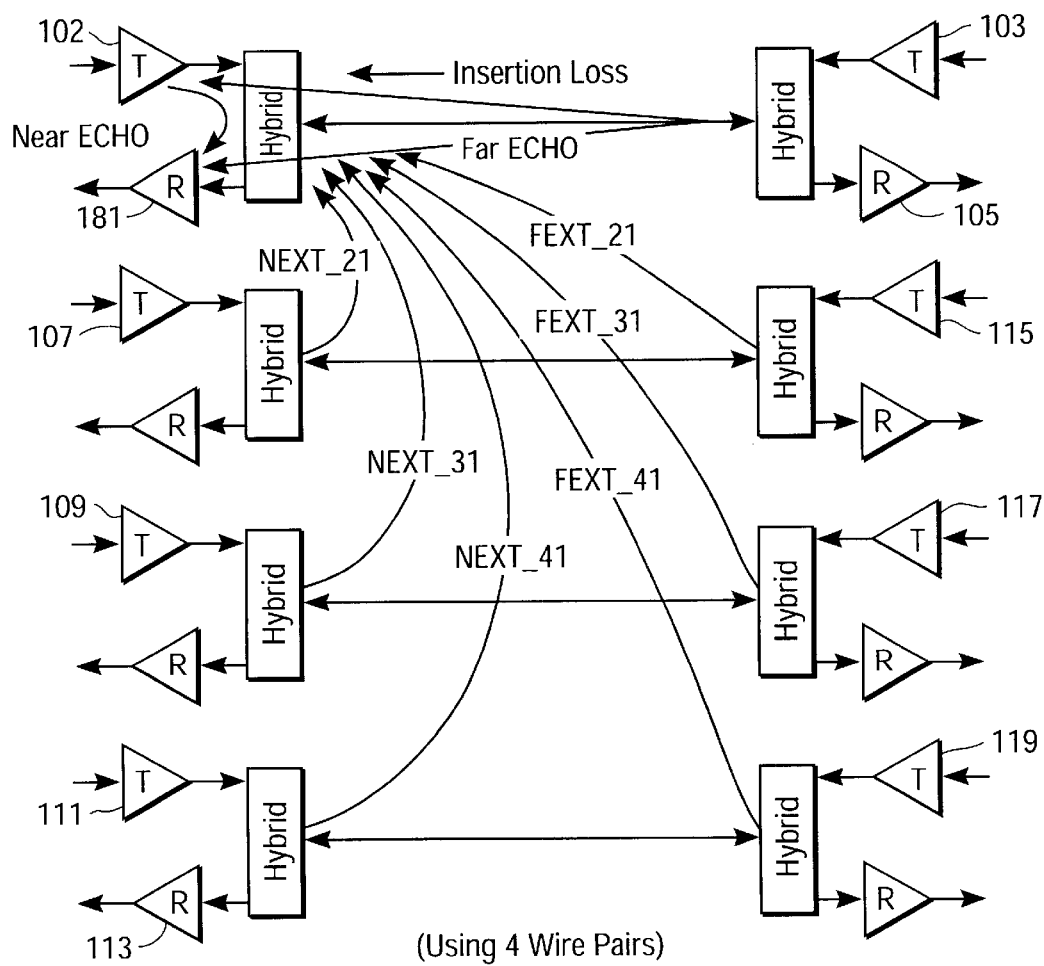
FIG. 1 illustrates the performance degradation for transceivers operating over UTP wiring caused by propagation loss and crosstalk generated between pairs.
Figure 2A:
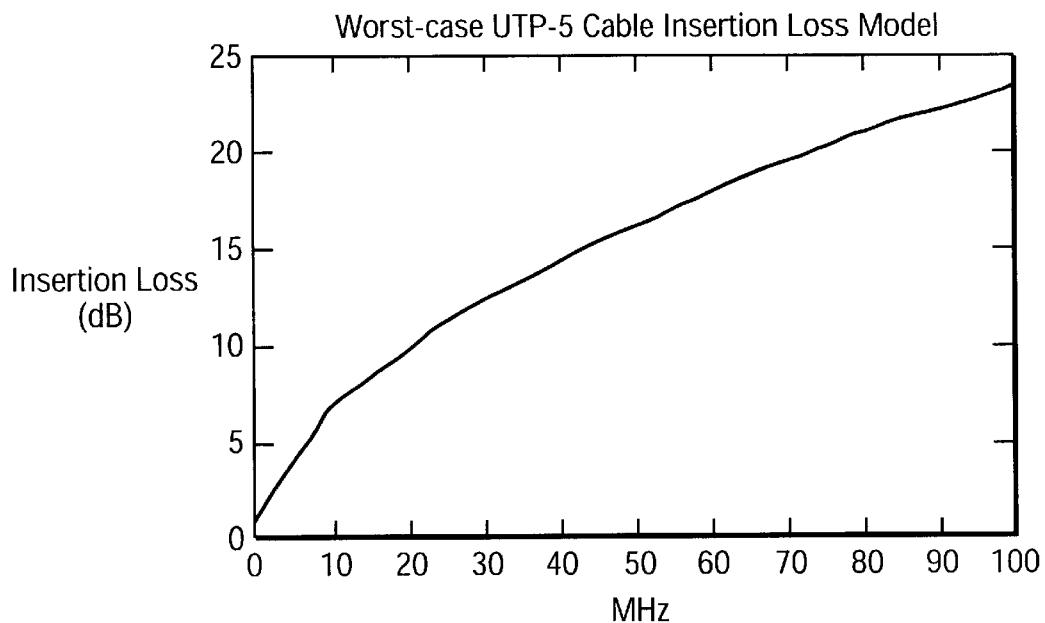
FIG. 2a illustrates the worst-case insertion loss associated with data transmitted over a 100 meter, Cat-5 cable.
Figure 2B:
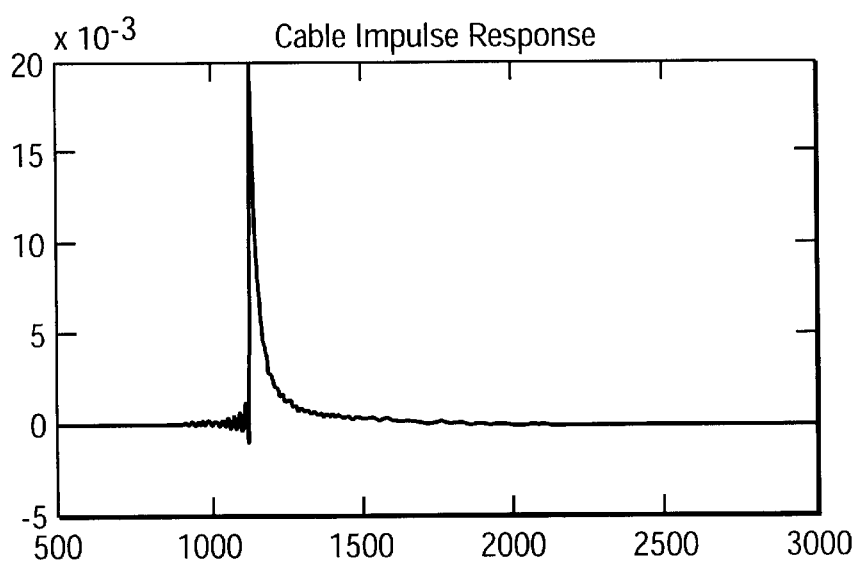
FIG. 2b illustrates the cable impulse response over a 100 meter, Cat-5 cable.

The two major causes of performance degradation for transceivers operating over UTP wiring are propagation loss and crosstalk generated between pairs, as shown in FIG. 1. Each UTP supports a 250 Mb/s full-duplex channel using a 5-level 125 Mbaud transmission scheme. Consider the transmission on pair#1. With respect to the Receiver #1L 101 on the left, its wanted signal is sent by the Transmitter #1R 103 on the right. The transmitter #1L 102 sends a signal to the Receiver #1R 105, but also generates spurious signal (called echo) to its own Receiver#1L 101. The interference signals generated by Transmitters 2L–4L 107–111, appear at the input of the Receiver #1L 101 are called near-end crosstalk (NEXT) interferers, NEXT_21 to NEXT_41. The interference signals generated by Transmitters 2R–4R 115–119 on the right appear at the input of the Receiver #1L 101 are called far-end crosstalk (FEXT) interferers, FEXT_21 to FEXT_41.

A. Propagation Loss:

The models for the propagation loss of a loop that are presented in this section are valid for frequencies that are larger than about 500 kHz. The signals considered in this paper have a very small amount of energy below this frequency. Thus, for simplicity, we will assume that the propagation loss models discussed here are valid at all frequencies. The transfer function H(d, f) of a perfectly terminated loop with length d can be written as follows:

$$H(d,f) = e^{-d\gamma(f)} = e^{-d\alpha(f)} e^{jd\beta(f)}$$

where $\gamma(f)$ is the propagation constant, $\alpha(f)$ is the attenuation constant, and $\beta(f)$ is the phase constant. The quantity that is usually specified in practice is the propagation loss for a given cable length (e.g., d=100 meters). The propagation loss (or insertion loss) limit $L_P(f)$ for category 5 (cat-5) 100 m cable is a positive quantity expressed in dB $$L_P(f) = -20\log|H(d = 100 \text{ m}, f)|$$
$$= \frac{20}{\ln 10}\alpha(f) \approx 2.1 f^{0.529} + 0.4/f$$

Figure 3:
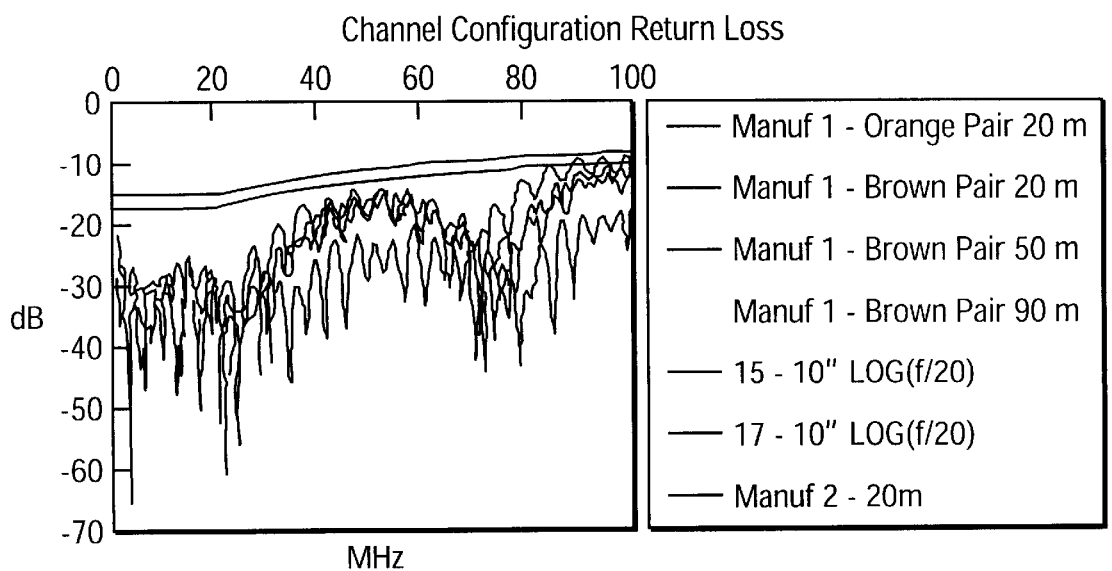
FIG. 3 shows the plot of the measured return loss and the return loss limit.

B. ECHO Loss:

The Echo loss is indicated by the return loss. FIG. 3 shows the plot of the measured return loss and the return loss limit which is 15 dB for frequency from 1 to 20 MHz and 15–10log(f/20) for frequency from 20 to 100 MHz.

Figure 4A:
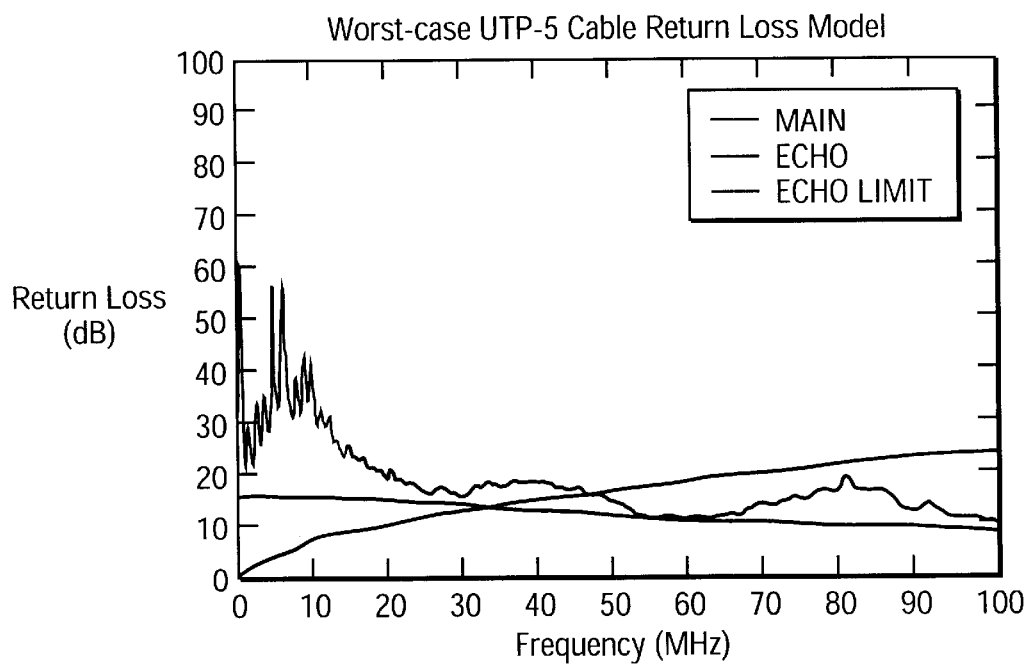
FIG. 4a illustrates the worst-case return loss between pairs of Cat-5 cable pairs.
Figure 4B:
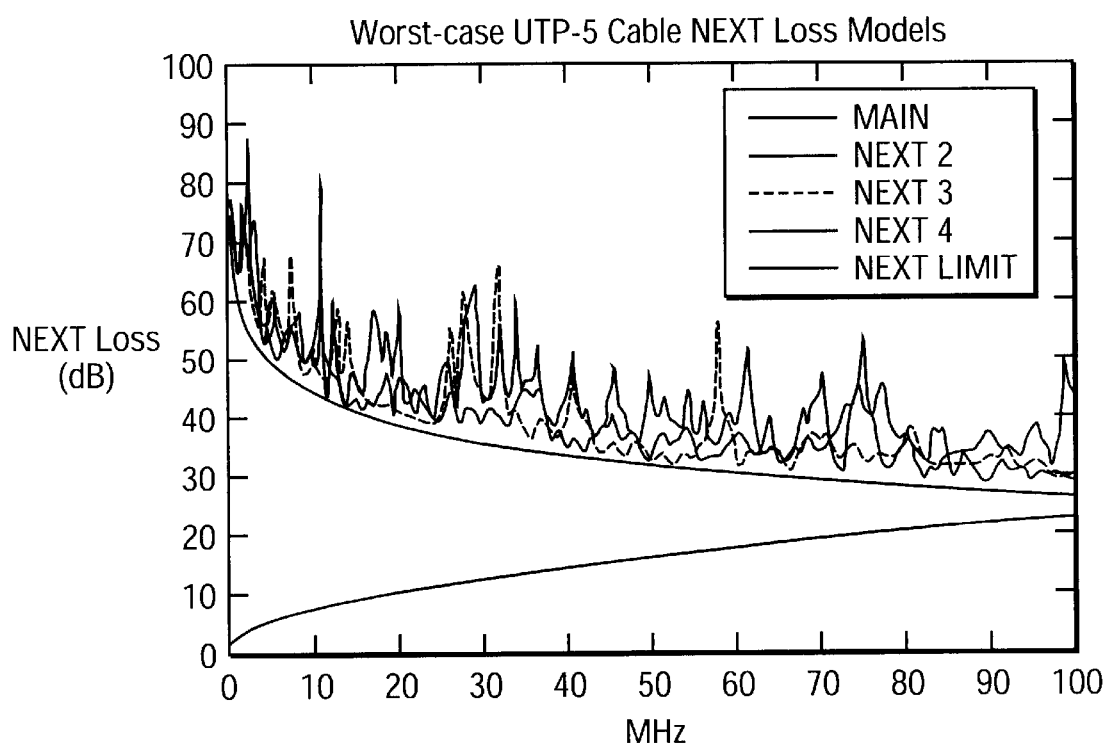
FIG. 4b illustrates the worst-case NEXT loss between pairs of Cat-5 cable pairs.
Figure 5:
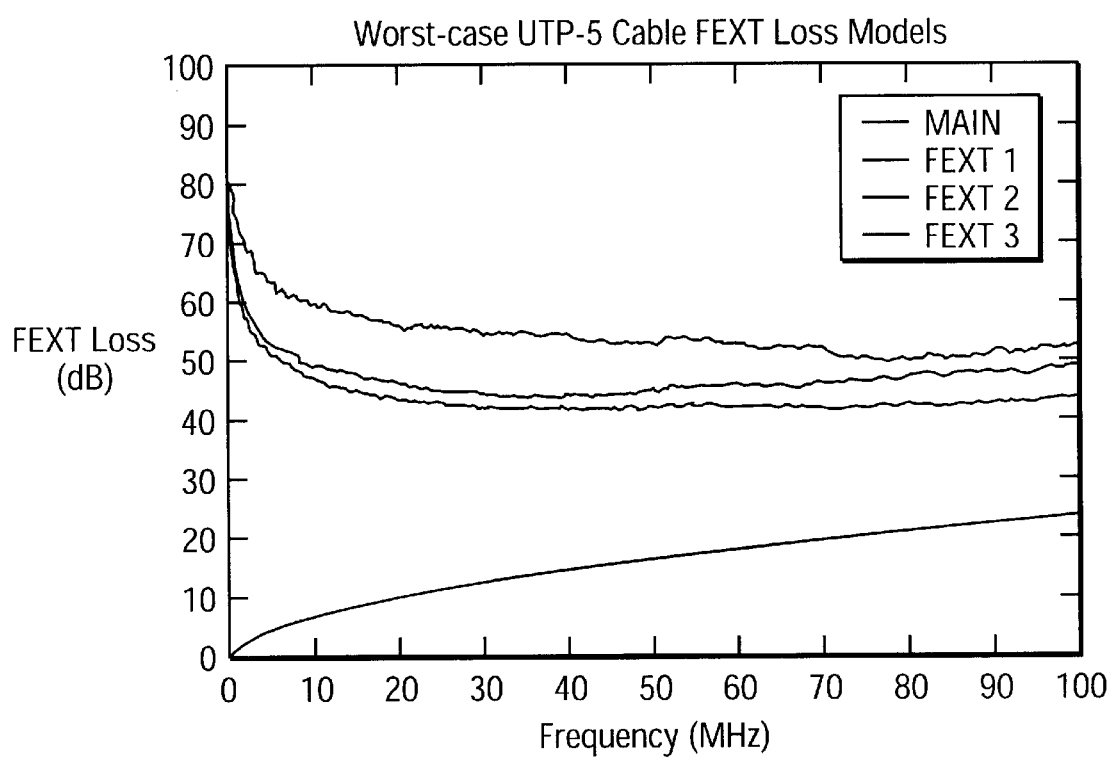
FIG. 5 illustrates the worst case FEXT loss between pairs of Cat-5 cable pairs.

C. NEXT Loss:

The wavy curves in FIG. 4 give the measured pair-to-pair NEXT loss characteristics for three different combinations of twisted pairs in 100 m cat-5 cables. The existence of the minima (small loss) and maxima (large loss) in these curves is due to the fact that the frequencies considered here correspond to wavelengths that are in the same length range as the distance between points of unbalance in the NEXT coupling path. Notice that the minima and maxima usually occur at different frequencies for the three pair combinations. Notice also that the NEXT loss corresponding to the minima decreases with increasing frequency and tends to follow the smooth dotted curve on the bottom in the figure, which is defined as the worst-case pair-to-pair NEXT loss (or NEXT loss limit) as a function of frequency. The worst-case TIA/EIA-568-A NEXT loss model shown in FIG. 4 is 27.1–16.8log(f/100) in dB.

D. Channel Modeling

Figure 6:
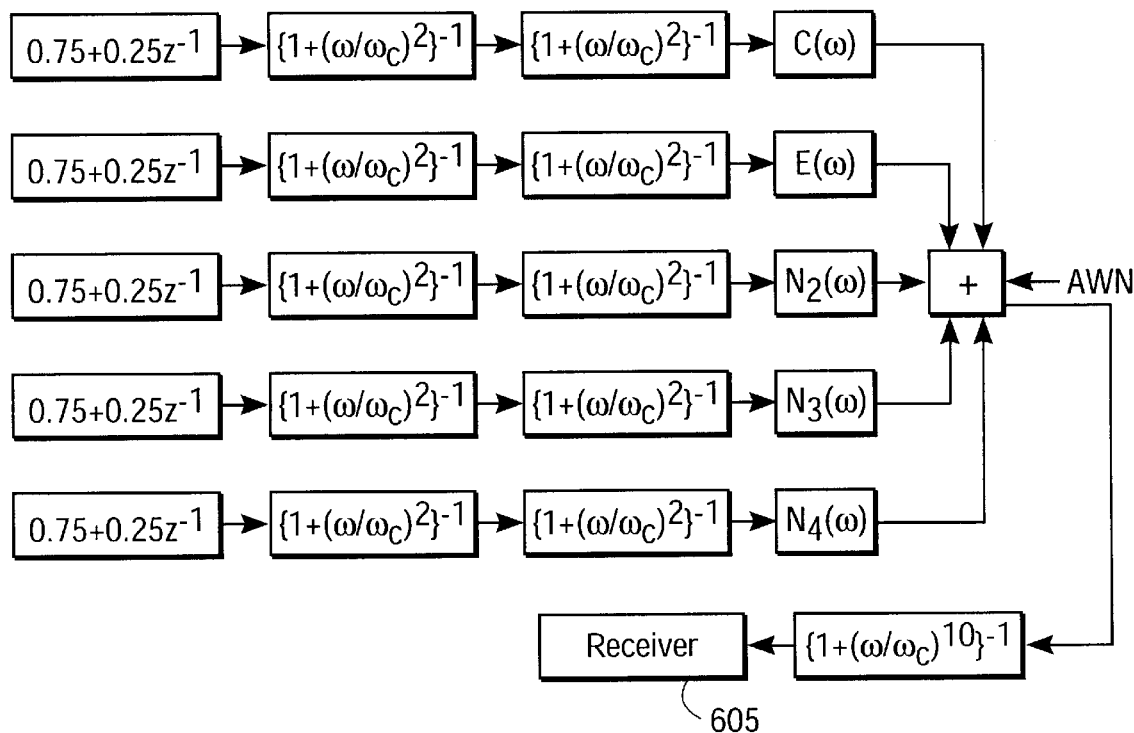
FIG. 6 illustrates the channel model including the effects of partial response, DAC and hybrid filtering in the transmitter, the main and coupling channel characteristics, and the filtering in the receiver front-end.
Figure 7A:
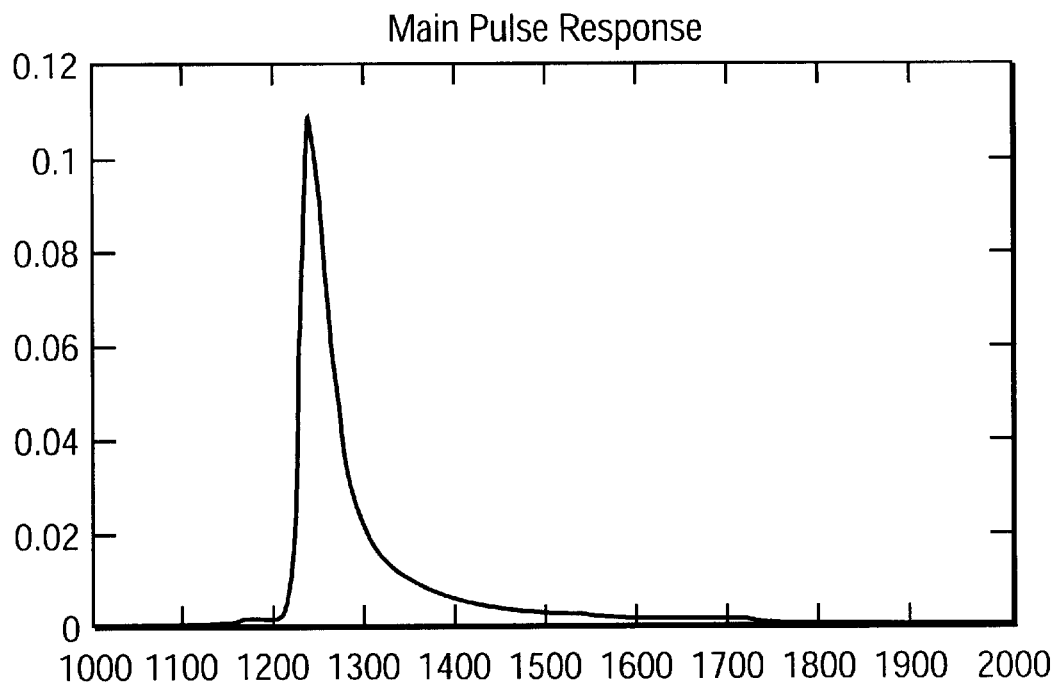
FIG. 7 illustrates the received pulse responses including both the mail pulse response and the NEXT pulse responses.
Figure 7B:
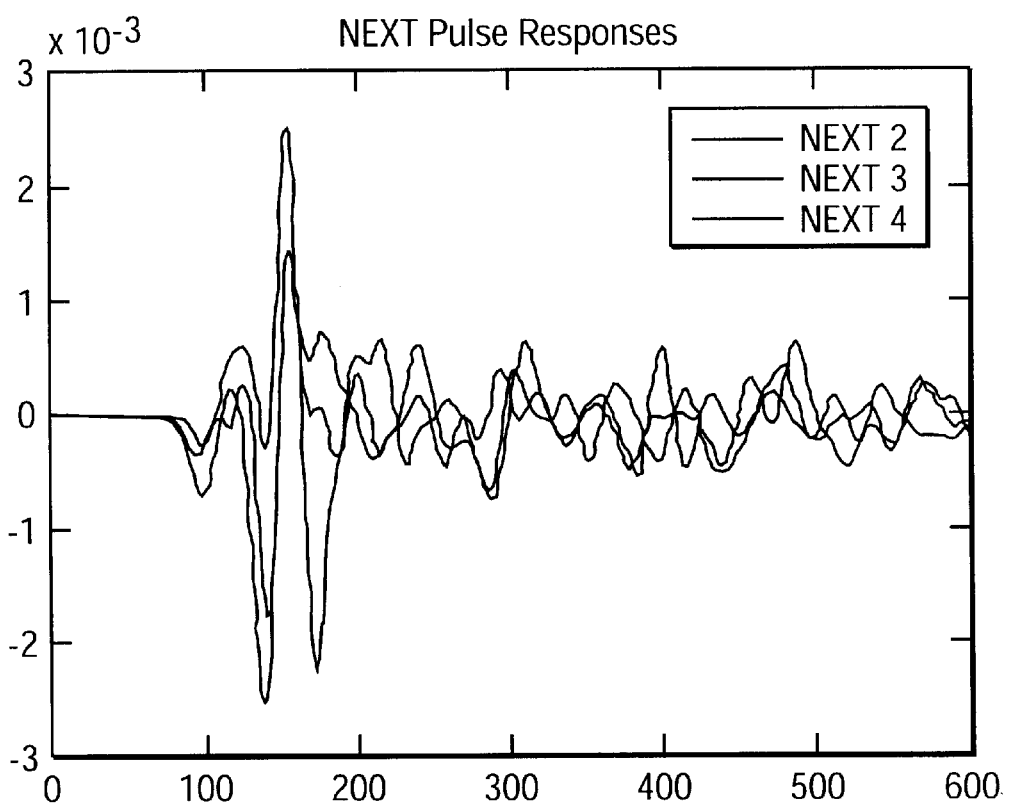
Figure 8:
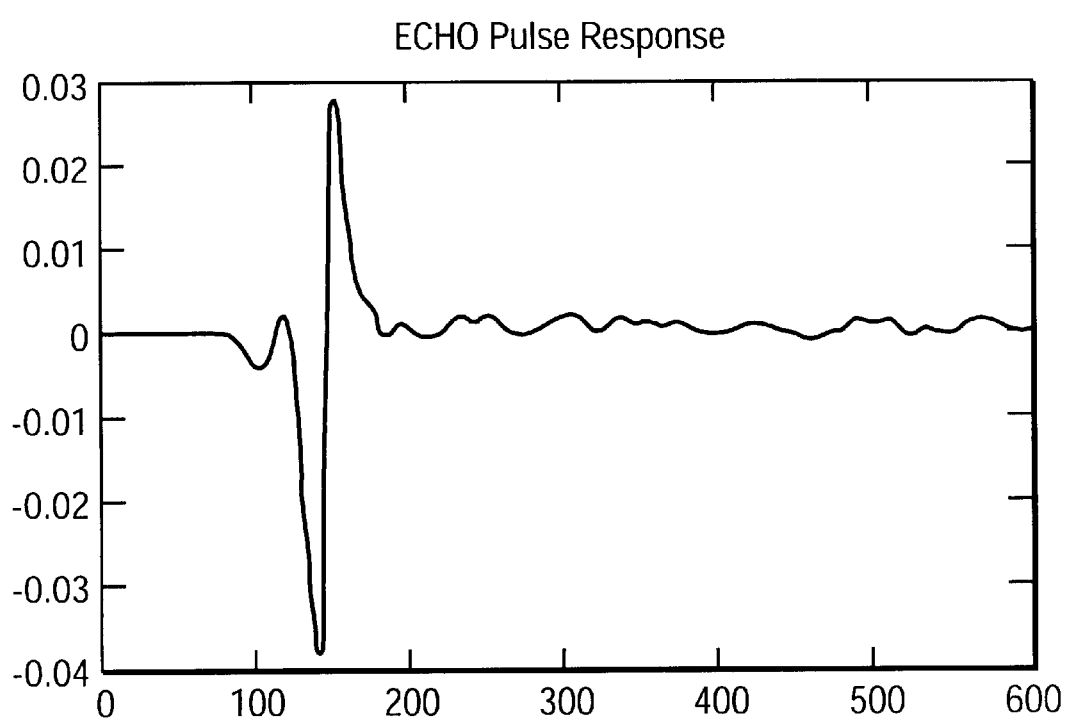
FIG. 8 illustrates the Echo pulse response using the present method.
Figure 9A:
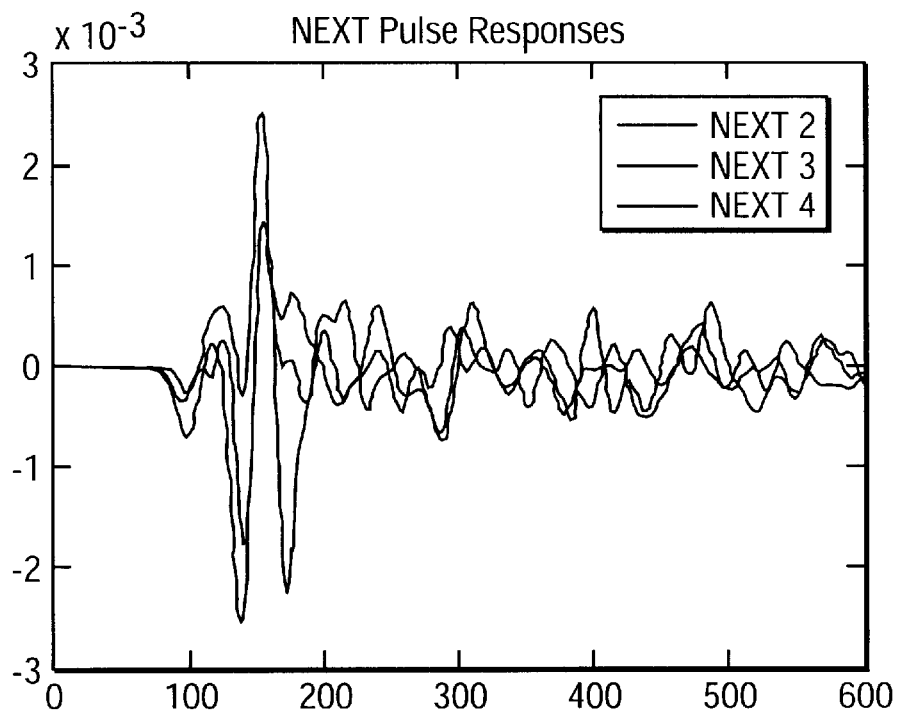
FIG. 9a illustrates the NEXT pulse response achieved using the present method.
Figure 9B:
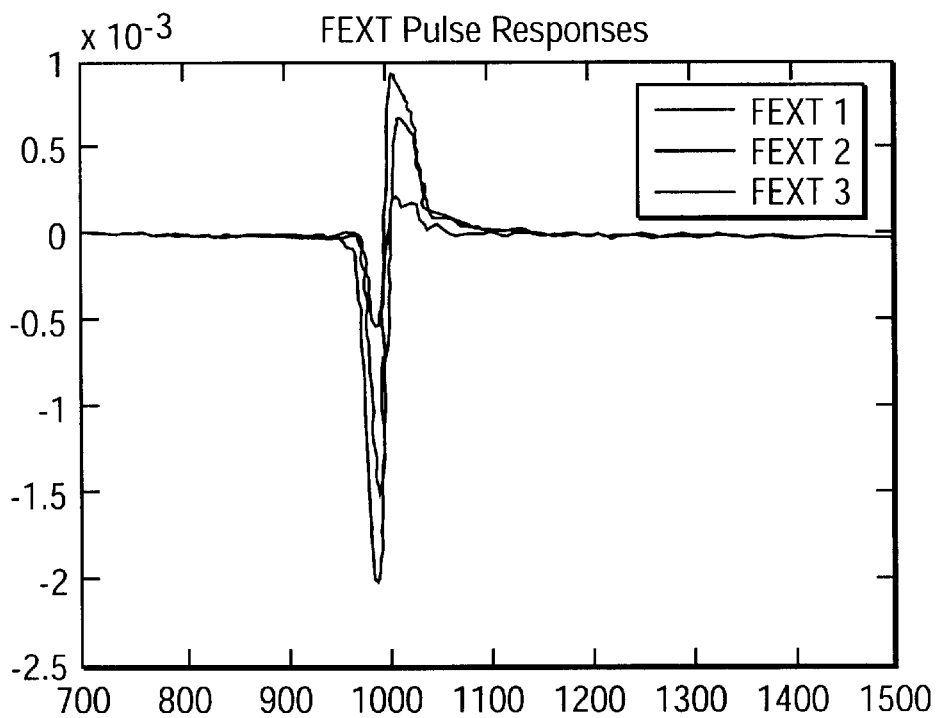
FIG. 9b illustrates the FEXT pulse response using the present method.

FIG. 6 shows the channel model including the effects of partial response, DAC and hybrid filtering in the transmitter, the main and coupling channel characteristics, and the filtering in the receiver front-end. The DAC and hybrid filtering is represented by the cascade of two identical first-order Butterworth sections with a corner frequency of 180 MHz. This introduces a 4 ns rise/fall time. The receiver front-end is modelled as a fifth-order Butterworth filter with a corner frequency of 80 MHz. The main channel, echo coupling and NEXT coupling channels are represented by $C(\omega)$, $E(\omega)$, $N_2(\omega)$, $N_3(\omega)$, and $N_4(\omega)$, respectively. The models for the FEXT's are similar to those of the NEXT's except the coupling channels will be $F_2(\omega)$, $F_3(\omega)$, and $F_4(\omega)$, instead of $N_2(\omega)$, $N_3(\omega)$, and $N_4(\omega)$. The pulse responses of the main, echo, NEXT's and FEXT's at the input of the RECEIVER 605 shown in FIG. 6 are shown in FIGS. 7, 8, and 9, respectively.

III. INTERFERENCE CANCELLATION AND SUPPRESSION (EQUALIZATION)

Figure 10A:
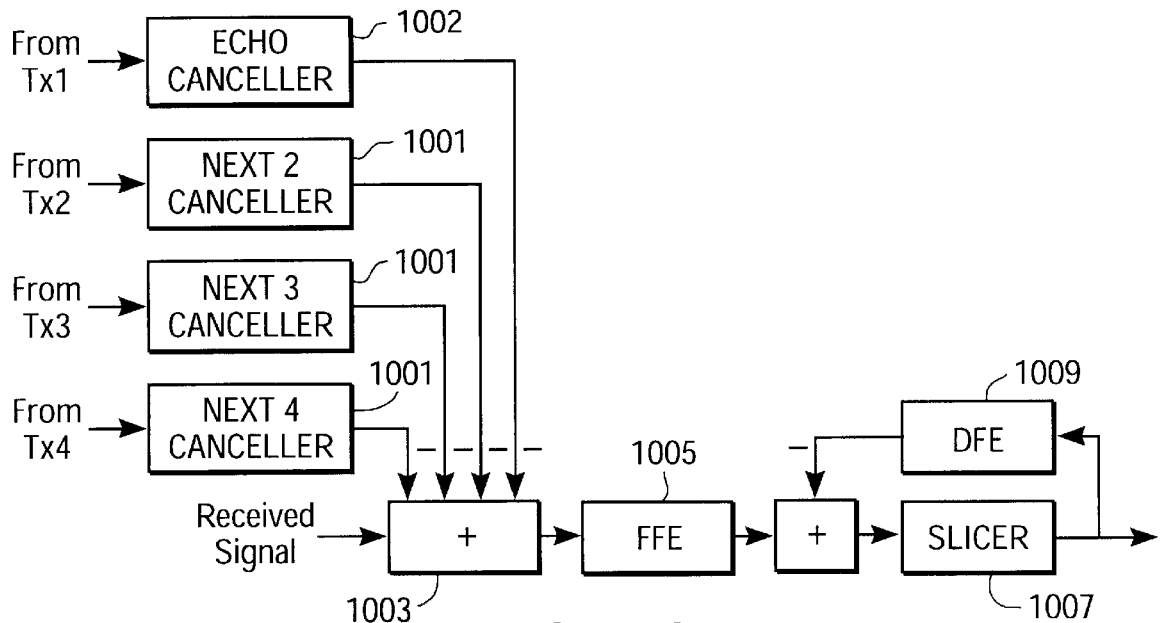
FIG. 10a provides a sample receiver structure using Interference cancellers prior to equalisation.
Figure 10B:
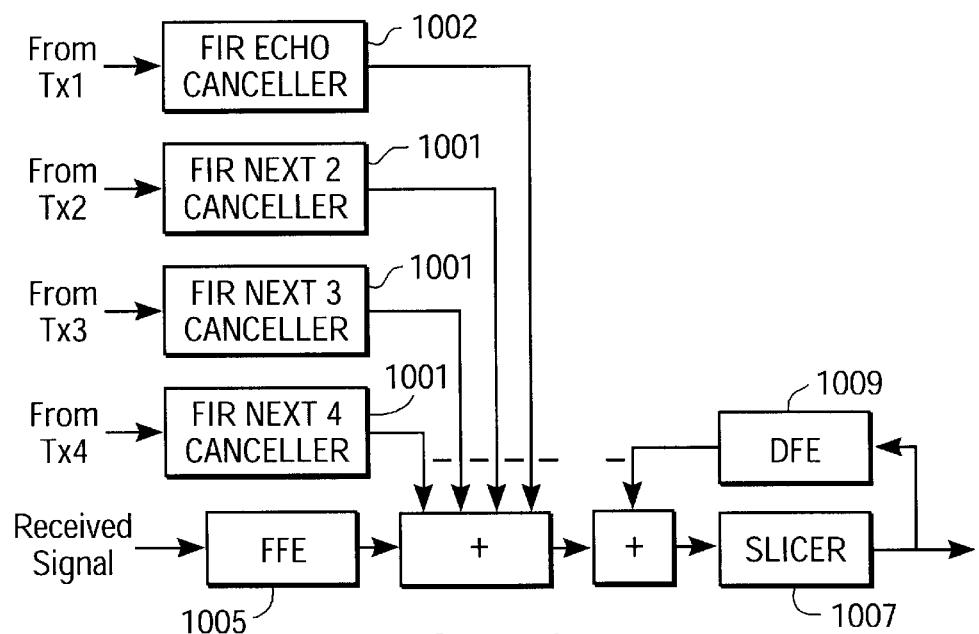
FIG. 10b provides a sample receiver structure using Interference cancellers after equalisation.
Figure 10C:
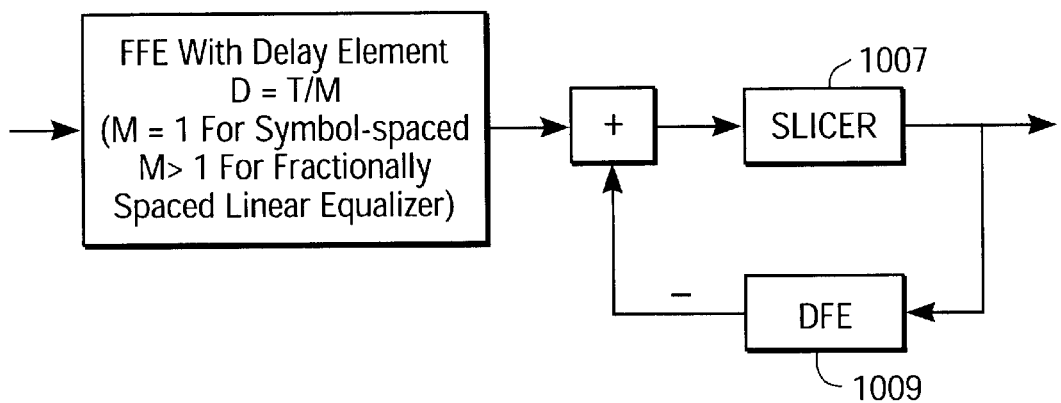
FIG. 10c provides a sample receiver structure using cascaded FSLE/DFE for both interference suppression and equalisation.

Reliable duplex operation at 250 Mb/s over two pairs of a CAT-5 UTP cable requires the usage of some kind of technique to combat interference including echo, NEXT and FEXT. Since the FEXT has a small contribution in interference level, we can neglect FEXT's and focus on the echo and NEXT's. Since the transmission on all four pairs uses the same Tx clock, the crosstalk can be shown to be cyclostationary, i.e., crosstalk statistics are periodic with period equal to a symbol interval. The two techniques that are presently being used are NEXT cancellation and NEXT equalization (or suppression). FIGS. 10*a–c* show three general receiver structures.

The structures shown in FIGS. 10*a* and *b* are based on interference cancellation. A NEXT canceller 1001 synthesizes, in an adaptive fashion, a replica of the NEXT interferer. The interferer is then cancelled out by subtracting the output of the canceller from the signal appearing at the receiver. A NEXT canceller 1001 has the same principle of operation as an echo canceller 1002, and all the familiar structures used for echo cancellers can also be used for NEXT cancellers. The cancellers 1001 need to have access to the local transmitters from which they get their input signals. Typically, this input signal is the stream of symbols generated by the transmitter's encoder. In FIG. 10*a* the output signal of the canceller 1001 is subtracted from the received signal immediately after the A/D. With such an approach, the canceler 1001 generates outputs at the same rate as the sampling rate of the A/D. An alternative embodiment is to make the subtraction at the input of the slicer 1007 as shown in FIG. 10*b*. In this case, the outputs of the canceller need only be generated at the symbol rate.

The FFE 1005 (feed-forward equalizer) in FIGS. 10*a* and *b* can be a symbol-spaced (SS) or fractionally spaced (FS) FFE or an analog equalizer. It is used to equalize the precursor ISI. The DFE 1009 is used to remove the post cursor ISI. Note that the performance of the DFE 1009 is also dependent on the reliability of the symbols detected by the slicer 1007 and influenced by the error propagation. For this, one may replace the simple slicer by a sequence detector (such as Viterbi decoder) for a better performance. In that case, the long processing delay of the decoder can be an issue.

With NEXT equalisation shown in FIG. 10*c*, no attempt is made to cancel out the NEXT interferer and there is no need to have access to the transmitter generating the interferer. Rather, the interfering NEXT signals are equalised at the receiver in such a way that it passes through zero at all the sampling instants of the slicer 1007. In FIG. 10b, the FFE 1005 or DFE 1009 used by the receiver equalises the desired signal received from the other end of the cable and the echo and NEXT interferers, but in a different fashion. Let f(t) be the impulse response of the in-phase component of the desired signal and r(t) be the impulse response of the in-phase component of the interferer. The conditions for perfectly equalising the desired signal and interferer in the desired fashion can then be written as f(kT)=δ(k) and r(kT)=0 where k is an integer, T is the symbol period, and δ(.) is the Dirac delta function, i.e., δ(0)=1 and δ(k)=0 for k≠0. These conditions also guarantee that the impulse responses of the quadrature component of the far signal and NEXT interferer satisfy f'(kT)=r'(kT)=0 for all k. Interference equalisation is optimally feasible if the transceiver uses a large excess bandwidth. Specifically, it can be shown that, with one cyclostationary interferer, these conditions can be satisfied if the transmitter uses an excess bandwidth of at least 100%. Heuristically, the need for such a large excess bandwidth can be explained as follows. With 0% excess bandwidth, an adaptive equaliser has just enough degrees of freedom to perfectly equalise one signal, but cannot do anything else. In order to equalise two signals, the number of degrees of freedom available to the equaliser has to be doubled with respect to what is required for one signal. This is achieved by doubling the bandwidth of the transmitted signal, which results in an excess bandwidth of 100%. Theoretically, it is possible to perfectly equalise the two interferers, but this requires the usage of an excess bandwidth of 200%, and, in general, perfect equalisation of n interferers requires an excess bandwidth of n times 100%. For most applications of bandwidth-efficient digital transmission schemes, the usage of excess bandwidth would be considered as a waste of bandwidth.

IV. ANALYSIS OF THE RECEIVER USING CASCADED FSLE/DFE:

FIG. 6 shows the overall system that is used to study the performance of the receiver structure using a FSLE cascaded with a DFE in the presence of interference (echo and NEXT's), ISI, and additive white noise (AWN). The AWN has power spectral density of $N_o/2$. The waveform received by the receiver is:

$$r(t) = \sum_{k=-\infty}^{\infty} a_k \phi_0(t-kT) + \sum_{l=1}^{N} \sum_{k=-\infty}^{\infty} b_{kl}\phi_l(t-kT-\Omega_l) + n(t) \quad (1)$$

where
  the first term of r(t) is the desired signal (i.e., sequence to be detected), while the second term represent N interferers, and n(t) is the AWN at the input of the FFE.
  $0 \leq \Omega_l \leq T$ is the lth interferer's delay. $\Phi_0(t)$ is the overall end-to-end pulse response (e.g., FIG. 7), and $\Phi_l(t)$ is the pair-to-pair pulse response of the lth interferer (e.g., FIGS. 8–9).
  $a_k$ is the transmitted symbol, $b_{kl}$ is the interfering symbol.
  It is assumed that:
  1) all $a_k$ and $b_{kl}$ are uncorrelated;
  2) $E(a_k)=0$; $E(a_k^2)=1$;
  3) $E(b_{kl})=0$; $E(b_{kl}^2)=1$; and
  4) there are no decision errors (i.e., practically negligible).

The input to the slicer (in FIG. 10c) is $$Y_n = \sum_{m=0}^{N_w} w_m r(nT-(mD+\theta)) + \sum_{m=1}^{N_f} f_m a_{n-m-p} \quad (2)$$

where θ is the sampling phase representing time shift in a symbol period, D=T/M is the delay element used in the FFE (M=1 for symbol-spaced FFE and M>1 for fractionally spaced FFE). $w_m$'s and $f_m$'s are the tap settings of the FFE and DFE, respectively, and p is the delay in the receiver's decision relative to the receiver's input. The FFE and DFE coefficients are optimized to minimize the mean squared error (MSE), where the error is:

$$e_n = Y_n - a_{n-p} \quad (3)$$

and includes interference, ISI, and AWN.
Equation (2) for the output of the slicer can be expressed as:

$$Y_n = U^T X_n,$$

where T is the transpose operator
$$U^T = [w_0 \ w_1 \ \ldots \ w_{N_w} \ f_1 \ f_2 \ \ldots \ f_{N_f}]$$
$$X_n^T = [R_n^T \ a_{n-1-p}^T]$$
with
$$R_n^T = [r(nT-\theta)r(nT-D-\theta) \ \ldots \ r(nT-N_w D-\theta)]$$
and $$a_{n-1-p}^T = [a_{n-1-p} \ a_{n-2-p} \ \ldots \ a_{n-N_f-p}] \quad (4)$$

The MSE we need to minimize is:

$$MSE = [E[(Y_n - a_{n-p})^2] = U^T A U - 2U^T V + 1 \quad (5)$$

where $A = E[X_n X_n^T]$, and $V = E[X_n a_{n-p}]$.
Setting the derivative of the MSE to zero, we find the optimum weight of the forward and feedback coefficients, which is:

$$U_{opt} = A^{-1} V \quad (6)$$

and the corresponding minimum MSE is $$MMSE = 1 - V^T A^{-1} V = 1 - V^T U_{opt} \quad (7)$$

where V and A are obtained by taking expectations, using (4):

$$V^T = E[\, a_{n-p} \ X_n^T \,]$$
$$= E[\, r(nT-\theta) \ \ldots \ r(nT-N_w D-\theta) \ a_{n-1-p} \ a_{n-p} \ \ldots \ a_{n-N_f-p} \ a_{n-p} \,]$$

This matrix A could be written as $$A = E\left[X_n X_n^T\right] = E\left[\begin{pmatrix} R_n \\ a_{n-1-p} \end{pmatrix}(R_n^T \ a_{n-1-p}^T)\right]. \quad (9)$$

$$A = \begin{bmatrix} A_1 & A_2 \\ A_2^T & I \end{bmatrix} \quad (10)$$

where $A_1 = E(R_n R_n^T)$, $A2 = E(R_n a^T_{n-1-p})$, and I is the identity matrix.
Under our assumptions, we find that $A_2 = [x_{ij}]$, where $$x_{i,j} = \Phi_0((p+j)T - iD - \theta), \ 0 \leq i \leq N_w, \text{ and } 1 \leq j \leq N_f \quad (11)$$

and $A_1=[q(i,j)]$, where $$q(i, j) = \sum_{k=-\infty}^{\infty} \Phi_0(kT - iD)\Phi_0(kT - jD) + \sum_l \qquad (12)$$

$$\sum_{k=-\infty}^{\infty} \Phi_l(kT - iD - \Omega_l) \cdot \Phi_l(kT - jD - \Omega_l) + R((i-j)D),$$

and $0 \leq i, j \leq N_w$.

$R(t)$ is the autocorrelation function of the power spectral density of AWN at the output of the receiver filter. Note that for stationary interference with power spectrum equal to that of the cyclostationary interference, the results are the same except the $q(i, j)$ term becomes:

$$q(i, j) = \sum_{k=-\infty}^{\infty} \Phi_0(kT - iD)\Phi_0(kT - jD) + \qquad (12b)$$

$$\frac{1}{T}\sum_l \int_{-\infty}^{\infty} \Phi_l(t)\Phi_l(t - (i-j)D)$$

$$+ R((i-j)D).$$

V. NUMERICAL RESULTS AND DISCUSSIONS

The above model and analysis are used with pulse shapes shown in FIGS. 7–9 to compute the SNR at the slicer input for different values of taps and D.

We assume a small contribution of AWGN, i.e. in the absence of NEXT, the receiver signal-to-noise ratio is about 60 dB The choice of a low AWN level ensures that crosstalk is the dominant additive impairment.

The performance measure used in the evaluations of this and the next section is output SNR, defined as SNR= $10*\log_{10}(1/\text{MSE})$ where the mean squared error (MSE) expression is shown by Equation (7) above. Thus, the transmitted data symbol levels are normalized so as to have unit variance.

feedback tap coefficients. Preliminary results on the SNR performance as a function of receiver sampling phase are summarized in FIGS. 11 and 12. In these figures, NT is the span of the FFE in terms of the number of symbol intervals, and D is the delay element used in the FFE. Hence, the number of taps of the FFE is given by the product of (NT)(T/D); and NF is the number of DFE taps.

Figure 11:
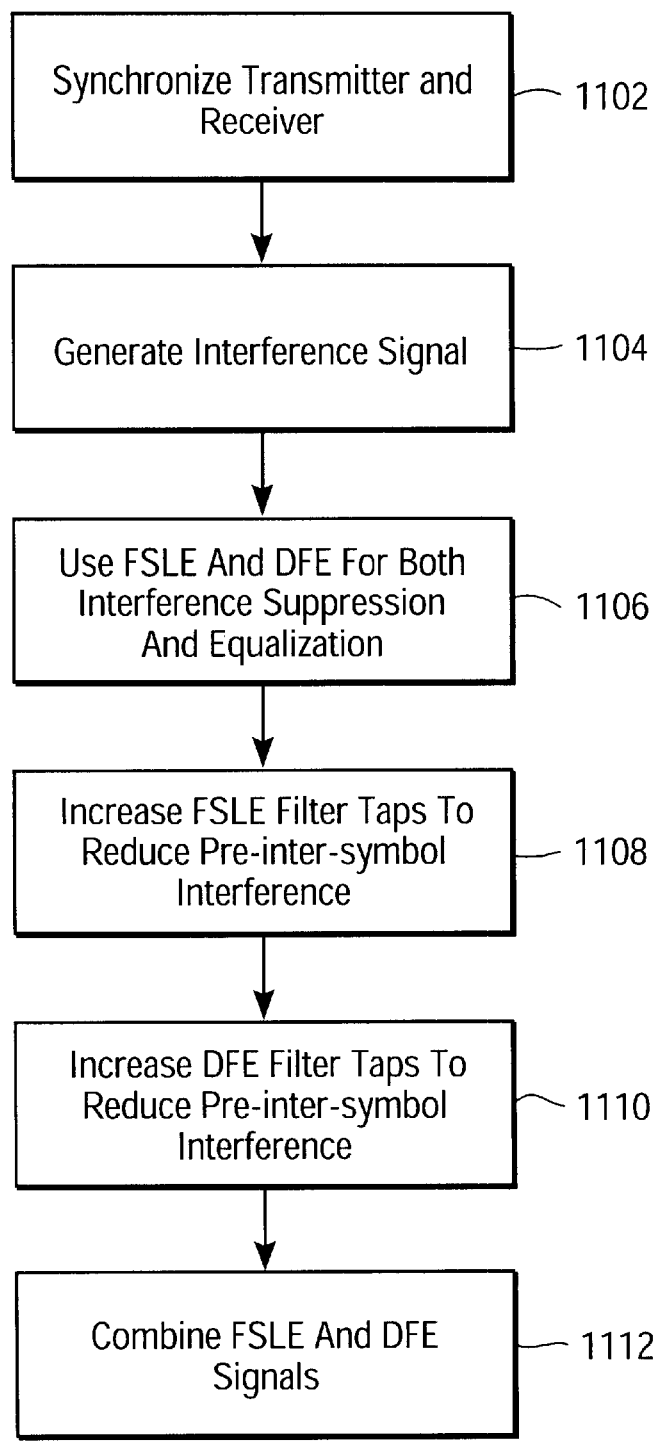
FIG. 11 is an illustration of a method for equalizing interference over a synchronized packet or frame according to one embodiment of the present invention.

As shown in FIG. 11, for the case of symbol-spaced FFE (i.e., D=T), the SNR is quite sensitive to the sampling phase with a variation of 6 dB. With a proper choice of sampling phase we can achieve an SNR of 27.36 dB. It also indicates that with a symbol-spaced FFE (i.e., D=T), the increase in NT from 16 to 32 does not make any noticeable improvement in SNR. In other words, NT=16 is sufficient.

For the case of fractionally spaced FFE (i.e., D=T/M with M>1), we can make the following observations:

The SNR is very much less sensitive to the sampling phase.

For NT>5, increasing NT from 6 to 32 introduces an increase in SNR of around 2.5 dB. As NT increases, the SNR increase get smaller and smaller. An SNR of 30 dB is achievable.

With NF=20, changing D=T/2 to D/4 will not provide a noticeable increase in SNR.

For NT=16 or larger, increasing NF from 20 to 80 does not provide a noticeable increase in SNR.

The results indicates that combinations of NF=20, NT=16 and D=T or T/2 are good choices:

The combination of NF=20, NT=16 and D=T with a proper sampling provides an SNR of 27.36 dB with symbol-spaced 16-tap FFE and The combination of NF=20, NT=16 and D=T/2 can achieve an SNR of 29.63 dB with a fractionally space 32-tap FFE, i.e. an increase of 2.27 dB in SNR at the expense of doubling the sampling rate and number of FFE taps.

Numerical Results

| sampl'g time | NT = 2, NF = 20, D = T/2 | NT = 4, NF = 20, D = T/2 | NT = 6, NF = 20, D = T/2 | NT = 8, NF = 20, D = T/2 | NT = 10, NF = 20, D = T/2 | NT = 12, NF = 20, D = T/2 | NT = 14, NF = 20, D = T/2 | NT = 16, NF = 20, D = T/2 |
|---|---|---|---|---|---|---|---|---|
| 0 | 1.85 | 24.80 | 27.58 | 27.97 | 28.56 | 29.23 | 29.28 | 29.63 |
| 2 | 1.79 | 25.19 | 27.55 | 27.94 | 28.54 | 29.24 | 29.27 | 29.62 |
| 4 | 1.78 | 25.70 | 27.53 | 27.92 | 28.51 | 29.17 | 29.28 | 29.54 |
| 6 | 1.83 | 26.19 | 27.54 | 28.00 | 28.49 | 29.06 | 29.25 | 29.44 |
| 8 | 1.93 | 26.44 | 27.57 | 28.13 | 28.55 | 29.00 | 29.15 | 29.36 |
| 10 | 2.77 | 26.50 | 27.57 | 28.19 | 28.64 | 28.94 | 29.03 | 29.28 |
| 12 | 5.96 | 26.53 | 27.58 | 28.24 | 28.72 | 28.91 | 28.99 | 29.23 |
| 14 | 10.02 | 26.58 | 27.62 | 28.30 | 28.82 | 28.97 | 29.08 | 29.29 |

| sampl'g time | NT = 16, NF = 40, D = T/2 | NT = 16, NF = 60, D = T/2 | NT = 16, NF = 80, D = T/2 | NT = 16, NF = 20, D = T | NT = 16, NF = 20, D = T/4 | NT = 32, NF = 20, D = T | NT = 32, NF = 20, D = T/2 |
|---|---|---|---|---|---|---|---|
| 0 | 29.75 | 29.87 | 29.91 | 26.38 | 29.70 | 26.60 | 30.61 |
| 2 | 29.73 | 29.84 | 29.88 | 24.43 | 29.66 | 24.64 | 30.57 |
| 4 | 29.64 | 29.75 | 29.79 | 22.65 | 29.76 | 22.86 | 30.47 |
| 6 | 29.54 | 29.66 | 29.71 | 21.29 | 29.76 | 21.49 | 30.34 |
| 8 | 29.47 | 29.61 | 29.66 | 21.32 | 29.76 | 21.50 | 30.22 |
| 10 | 29.40 | 29.55 | 29.62 | 23.74 | 29.75 | 23.91 | 30.10 |
| 12 | 29.36 | 29.54 | 29.61 | 26.43 | 29.93 | 26.59 | 30.07 |
| 14 | 29.42 | 29.60 | 29.67 | 27.36 | 29.91 | 27.54 | 30.17 |

With the above channel models, SNR, maximized with respect to receiver sampling phase, has been evaluated for two interferers for various numbers of DFE feedforward and While the present system and method have been described with reference to specific embodiments, those skilled in the art will recognize that these procedures may be applied to all kinds communications channels and filtering mechanisms. Thus, the scope of this invention and claims should not be limited by the described implementations.

I claim:

1. In a bi-directional data channel between a central station and a plurality of remote stations, wherein the central station and the plurality of remote stations comprises a plurality of transmitters and receivers, a method for equalizing interference over one of a synchronized packet and frame based baseband transmission system wherein the crosstalk on the system is cyclostationary or periodic with a period equal to a symbol interval, the method comprising the steps of:

synchronizing the transmitters and receivers;

generating an interference signal at the synchronized transmitters at one or more remote stations and the central station;

using cascaded Fractionally Spaced Linear Equalizer (FSLE) and Decision Feed back Equalizer (DFE) for both interference suppression and equalization to increase a signal to noise ratio with a small excess bandwidth at the receivers;

while holding the DFE constant, adding FSLE filter taps to the receiver FSLE filter to reduce pre-inter-symbol interference cursor and noise propagation;

while holding the FSLE constant, adding DFE filter taps to the receiver DFE filter to reduce post-inter-symbol interference; and combining a first signal output from the FSLE/DFE with phase sampling adjustments, to increase the signal to noise ratio to enable use of spectral correlation properties peculiar to the generated interference signal.

2. The method as recited in claim 1, wherein the step of combining further comprises the step of increasing the receiver FSLE filter taps to 16, wherein the data channel comprises a 100 meter 1000 baseT ethernet cable.

3. The method of claim 2, wherein the step of combining further comprises the step of doubling the sampling rate of the generated interference signal.

4. The method of claim 3, wherein the step of combining further comprises the step of increasing the receiver DFE filter taps to 20.

5. The method of claim 4, wherein the step of combining comprises the step of increasing the FSLE and DFE filter taps to 32.

6. The method as recited in claim 1, wherein the step of synchronizing comprises transferring synchronization information, wherein the information comprises the time of a precision clock between the one or more remote stations and the central station.

7. The method as recited in claim 6 wherein the step of synchronizing further comprises transferring synchronization information, wherein the synchronization information includes the frequency and phase of the generated interference signal between the one or more remote stations and the central station.

8. The method of claim 7, wherein the synchronization information is transmitted over the generated interference signal.

9. The method of claim 8, wherein the synchronization information is transferred over the generated interference signal without using overhead subchannels.

10. The method as recited in claim 1, wherein the method further comprises the steps of:

measuring and calibrating the data channel by sending control signals between the synchronized remote stations and the central station;

characterizing the data channel so that imperfections, in frequency, phase and time distortions, are identified; and using the data channel measurements to enhance signal quality by controlling the identified imperfections of the data channel.

* * * * *